Feb. 21, 1967　　　　　　　　J. S. HELLEN　　　　　　　3,304,809
TORQUE TRANSMISSION DEVICE
Filed Dec. 18, 1964　　　　　　　　　　　　　　　　　　2 Sheets-Sheet 1

JAMES S. HELLEN
INVENTOR.

BY

ATTORNEY

Feb. 21, 1967　　　　　　　J. S. HELLEN　　　　　　　3,304,809
TORQUE TRANSMISSION DEVICE
Filed Dec. 18, 1964　　　　　　　　　　　　　　　2 Sheets-Sheet 2

JAMES S. HELLEN
INVENTOR.

BY

ATTORNEY

United States Patent Office 3,304,809
Patented Feb. 21, 1967

3,304,809
TORQUE TRANSMISSION DEVICE
James S. Hellen, Wayne, N.J., assignor to General Precision Inc., Little Falls, N.J., a corporation of Delaware
Filed Dec. 18, 1964, Ser. No. 419,379
19 Claims. (Cl. 74—798)

This invention relates to torque transmission devices generally and, in particular, to gearless, torque transmission devices capable of extremely high speed-reduction ratios.

The achievement of high speed-reduction ratios has long been a challenge in the field of torque transmission whether by means of gears or frictionally-engaging members. Geared drives involve the use of long gear trains, i.e., embodying numerous gears to achieve the desired reduction ratio in a series of stages; due to their complexity, such gear trains are difficult and expensive to design and manufacture and, because the backlash occurring between each meshing pair of gears adds up along the train, the total backlash is intolerable for many applications. In any case, extreme precision in the gear design and manufacture is required to hold backlash to an acceptable minimum.

Friction drives, of course, are not generally beset by the problem of backlash, but where high reduction ratios are achieved in a series of stages in a manner analogous to multi-stage gear trains, all other shortcomings are generally the same.

The problem with high reduction ratios has been solved to a degree in recent years by the introduction and development of the "harmonic drive" concept. While transmissions operating on this principle have the virtue of high reduction ratios achieved in a single stage and are, consequently, characterized by a small number of parts and, concomitantly, by compact design, they nevertheless require a relatively high degree of precision in their manufacture and are, accordingly, relatively expensive.

With this state of the art in view, it is the fundamental object of the present invention to provide a torque transmission device which avoids or mitigates at least one of the problems outlined above.

A more specific object is the provision of a high reduction ratio torque transmission device which is extremely simple and inexpensive in construction and susceptible of low-cost, high-volume production.

Another object is the provision of a torque transmission device which is characterized by low inertia and the total absence of backlash and possesses an inherent torque-limiting capability.

A further object of the invention is the provision of a torque transmission device in which standard parts can be arranged to give the desired speed-reduction ratio which is determined by, and at the time of, the assembly of parts in the transmission.

A still further object is the provision of a torque transmission device which can be made to compensate for temperature changes so that the ratio of input to output speed may be made to vary with ambient temperature changes.

A still further object is the provision of a high reduction ratio torque transmission which can be designed for ratios ranging from a low of several hundred to one to several thousand to one with no substantial difference in cost of manufacturing.

Another object is the provision of a torque transmission device including a vapor-proof barrier (hermetic seal) between input and output members.

To the fulfillment of these and further objects, the invention contemplates a torque-transmission device comprising a pair of coaxially nested members of generally tubular configuration, both of which have relatively thin side walls formed of resilient material so that the side walls are radially distortable. The outer diameter of the inner member is slightly smaller than the inner diameter of the outer member and one of the members is adapted to be fixed against rotational displacement. Means are provided for jointly distorting the circumferences of both of the tubular members radially outwardly at a localized region and for angularly displacing the region about the circumferences. The speed ratio between the fixed and driven elements is determined by the degree of difference between the outer diameter of the inner element and the inner diameter of the outer element.

Additional objects of the invention, its advantages, scope, and the manner in which it may be practised will be readily apparent to persons skilled in the art from the following description of exemplary embodiments thereof taken in conjunction with the subjoined claims and annexed drawings in which like reference numerals denote like parts throughout the several views and wherein:

Figure 1:
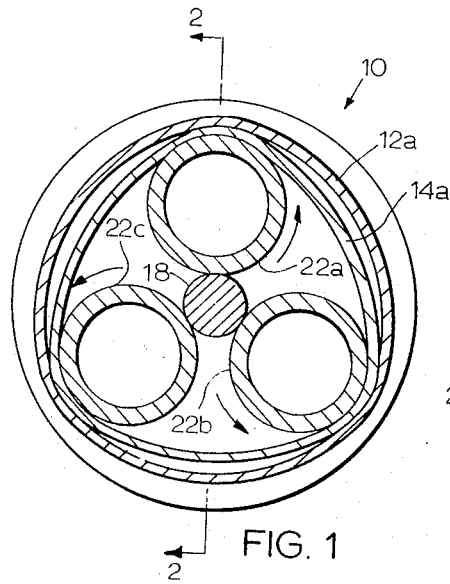
FIG. 1 is a cross-sectional view taken on line 1—1 of FIG. 2.

The fundamental principles of the invention will now be described with reference to a basic structural embodiment illustrated in FIGS. 1 and 2, which embodiment is designated in its entirety by reference numeral 10. The device 10 consists of a pair of generally similar cup-shaped elements 12 and 14 coaxially nested with their open ends in confrontation. The side walls 12a and 14a are of tubular configuration and are formed of a resilient material which, in most cases would very likely be a metal such as brass, steel, aluminum, or the like. Particular combinations of different metals may be employed to achieve temperature compensation as will be explained as this description proceeds. The end walls 12b, 14b which form the "bottoms" of the cup-shaped members are relatively thick as compared to the side walls and, consequently, are quite rigid. A series of cutouts or perforations 12c, 14c are provided about the periphery of the side walls adjacent the end walls in order that the rigidity of the latter will not greatly diminish the compliance of the former.

In the illustrated embodiment, the inner member 14 is fixed against rotation as indicated at 16, and the outer member 12 is the driven or output element; in accordance with the present invention, the driven member is impelled to rotate relative to fixed member 14 by means of a "creeping" action which is caused by jointly distorting the circumferences of both members radially outwardly at a localized region and angularly displacing this region about the circumferences. To this end, a drive member, taking the form of a cylindrical drive shaft 18, is journaled in anti-friction bearings 20a, 20b in end walls of the cup-shaped members for rotation about the common axis thereof.

Figure 2:
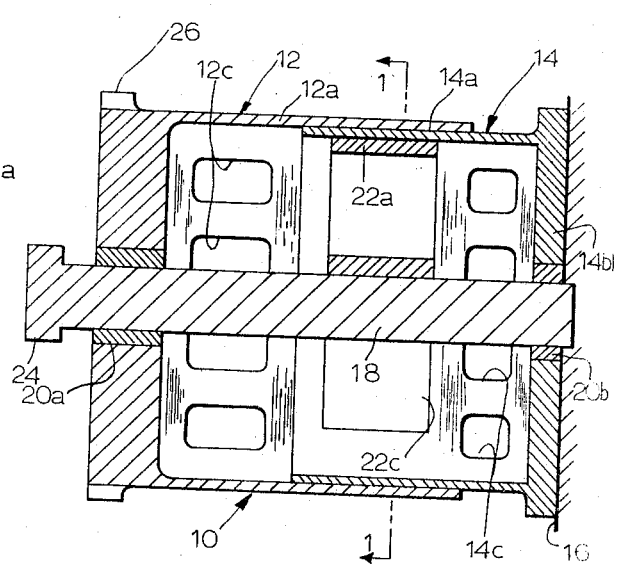
FIG. 2 is an axial sectional view, as indicated by line 2—2 of FIG. 1, showing a torque transmission device in accordance with the present invention.

A plurality of planetary members 22a, 22b, 22c, three in the illustrated embodiment, are disposed about the drive member as best appears in FIG. 1. Each of the planetary members consists of a hollow cylinder having an axial dimension which is preferably considerably smaller than the nested portions of the cup members 12, 14.

While the planetary members are shown to be hollow in the interest of economy of material and for minimum weight, these members can, of course, be solid. The critical requirement is that they have a circular cross-section and a diameter which is such in relation to the diameter of the drive shaft 18 and the nested tubular side walls 12a, 14a that when the planetary members are installed within the nested members as shown in FIG. 1, the circumferences of the side walls of the nested members are distorted radially outwardly.

As best appears in FIG. 1, the planetary members are tangent to drive member 18 at three equi-angularly spaced points about the circumference of the drive member and are tangent with the inner surface of the side wall of inner tubular member 14 at three coinciding, angularly-spaced locations. Thus, the side walls of both tubular members are deformed radially outwardly at the respective points of tangency with the planetary members giving the side walls of the tubular members a somewhat triangular configuration which, it will be understood, is grossly exaggerated in the drawings for the purpose of clarity. In consequence of this distortion, the clearance which exists between the outer surface of the side wall of the inner member in the inner surface of the side wall of the outer member is confined to, and magnified in, spans between the points of tangency and completely eliminated at the points of tangency. A gear portion 24 on one end of drive member provides means for drivingly connecting the member to source (not shown) of input power; similarly, a gear portion 26 on driven member 12 provides for power take-off.

In operation, a rotary drive is imparted to drive member 18 by means of an electric motor or any other suitable power source connected to gear 24. Assuming the direction of rotation of the drive member to be clockwise as indicated by the arrows in FIG. 1, by virtue of the forcible frictional engagement between drive member 18 and the planetary members 22a, b, c, all of the latter are caused to rotate individually in a counter-clockwise direction; in turn, the planetary members collectively, by reason of their forcible frictional engagement with the inner surface of inner member 14, planetate in a clockwise direction about the common axis of the nested tubular members. As a result of the planetary movement of the planetary members, the regions of deformation of the side walls are collectively angularly displaced about the common axis of the tubular members and drive shaft. The inner member is fixed against displacement but due to the creep produced by the flexing and angular displacement of the region of flexure of the side walls of the cup-shaped members, the outer member, which is not restrained, rotates at an extremely low rate. The ratio of the rotational speed of the input drive member 18 and output cup-shaped member 12 is determined by the cross-sectional dimensions of the drive member and planetary members, and, importantly, the difference between the O.D. of the inner member 14 and the I.D. of the outer member 12. In this connection it will be appreciated that in the event that this difference were reduced to substantially nil as the case of a shrink or interference fit, while there might be a tendency to creep, this would be resisted by the extreme tightness of the fit between the two members. Under these conditions, the output speed would be zero and the reduction ratio, therefore, could be considered infinite.

From the structure thus far described, it will be appreciated that the maximum torque which can be transmitted by the device is limited by the force of friction between the inner and outer members at their regions of tangency. This fact imparts an inherent torque-limiting capability to the transmission which can be controlled by selection of the surface finishes, coefficient of friction of the materials of the nested members, and dimensional parameters affecting the degree of distortion.

As the reduction ratio is a function of the difference between the I.D. of outer member 12 and the O.D. of inner member 14, the particular metals or other materials from which these members are made can be selected with regard for their coefficients of thermal expansion to counter-act (or, if desired, intentionally produce) temperature dependency of the speed reduction ratio.

Figures 3, 4:
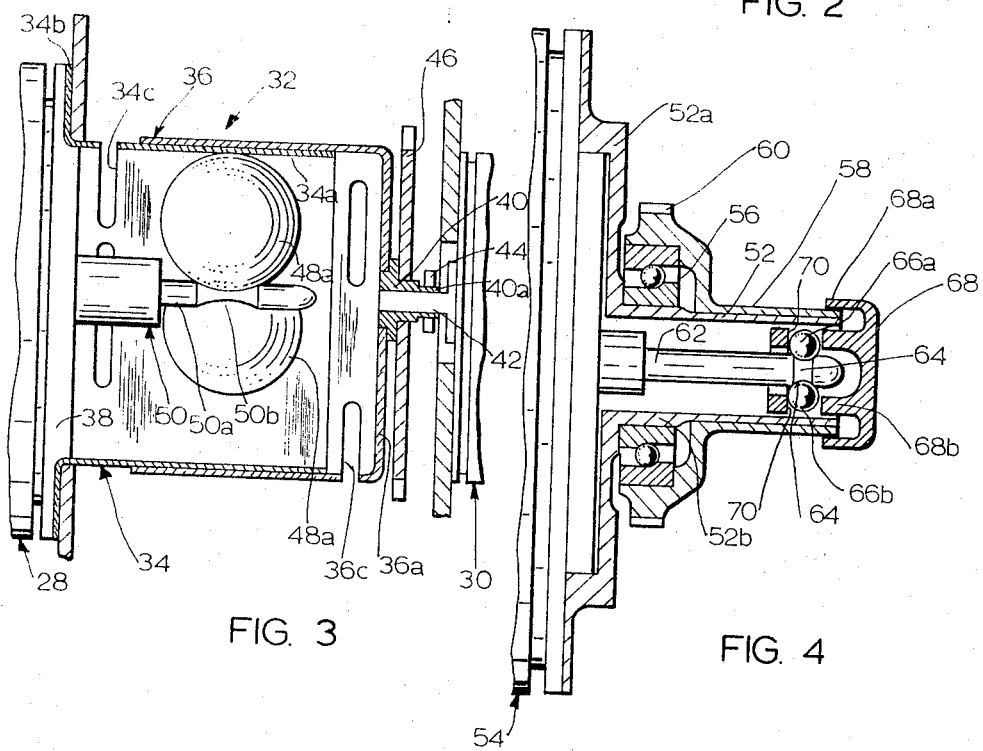
FIGS. 3, 4 and 5 are views similar to FIG. 2 showing respective modified embodiments of the invention.

In FIG. 3 there is illustrated a modified form of the invention embodied in a coupling between a drive motor 28 and a driven device 30. As in the previously-described embodiment, the transmission device 32 consists of loosely-nested inner and outer tubular members 34 and 36, respectively. In this case, however, the inner member 34 takes the form of a hollow sleeve 34a having a flange 34b at one end remote from the end nested with outer member 36. The flanged end of member 34 is adapted to receive and be secured to a mounting boss 38 on the housing of drive motor 28.

Outer member 36, as in the case of the first-described embodiment, is of cup-shaped configuration and has a coupling member 40 coaxially secured to, and projecting outwardly from its closed end wall 36a. Coupling member 40 has a tapered split collet portion 40a which slidably receives the input drive shaft 42 of driven member 30. A locking collar 44 on tapered split collet 40a, when driven upward on the taper, locks the drive shaft in the collet.

In one practical application of the invention, driving motor 28 and driven element 30 may form a servo motor system. In such a case, a gear 46 mounted on the coupling member 40 provides a mechanical take-off.

As in the embodiment already described, both of the nested tubular members 34, 36 are provided with elongated apertures 34c and 36c, respectively, in their side walls adjacent their respective ends remote from the nested portions of their side walls.

In the FIG. 3 embodiment, the planetary members 48a, 48b are spherical rather than cylindrical in configuration. While only two appear in the drawing, three planetary members are utilized, disposed equi-angularly about the common axis of tubular members 34, 36 as in the case of the cylindrical planetary members, shown in FIG. 1. To prevent axial movement of spherical planetary members 48a, 48b, the drive member in the FIG. 3 embodiment, which would be the output shaft 50 of drive motor 28, is provided with a reduced diameter portion 50a circumferentially grooved to define an arcuate raceway 50b for the planetary members. The dimensional parameters affecting the speed reduction ratios are the same for the FIG. 3 embodiment is already discussed in detail relative to FIGS. 1 and 2.

Another embodiment of the invention, adapted particularly for use as a speed reduction unit on electric motors is illustrated in FIG. 4. In this embodiment, the inner tubular member 52 is formed as an integral part of or, if expedient, fixedly secured to, a mounting flange 52a adapted to be fastened to end housing of a motor 54. The wall of the tubular portion is thickened or enlarged at 52b to provide a shoulder on which is mounted a ball bearing set 56.

The outer tubular member 58 has an extended axial portion nested with inner member 52 and, at the end adjacent the mounting flange of the inner member, is formed with or secured to a ring gear 60 rotatably mounted on ball bearing 56. Motor 54 has an output shaft 62 extending coaxially into nested tubular members 52, 58 and substantially co-extensive therewith. Adjacent the outer ends of the tubular members, the motor shaft is grooved to provide a raceway 64 for planetary members 66a, 66b of spherical configuration in a manner already described in conjunction with the FIG. 3 embodiment. The ends of tubular members 52, 58 carry a combination cap and retainer 68 for the planetary members. The cap-retainer member has a lip portion 68a which extends over the extreme end of outer tubular member 58, making a running fit therewith. Radially inwardly from the lip, cap-retainer member 68 has a hollow cylindrical portion 68b which extends coaxially into inner tubular member 52 with a substantial amount of clearance. The extreme end of motor drive shaft 62 is received within this cylindrical portion and the side walls of the cylindrical portion contain apertures 70 in which are disposed planetary members 66a, 66b, etc.

In operation, drive shaft 62 rotates in one direction causing planetary members 66a, 66b, etc., to revolve in the opposite direction about their respective centers and planetate in the same direction as shaft 62 about the shaft axis. Thus, the radial outward deformation of the nested tubular members caused by the planetary members is angularly displaced about the shaft axis and due to creep, as already described, causes the outer member to rotate at a vastly reduced rate. Consequently, the rate of rotation of output gear 60 of the motor may be many orders of magnitude smaller than the rotation rate of the motor shaft itself.

Figure 5:
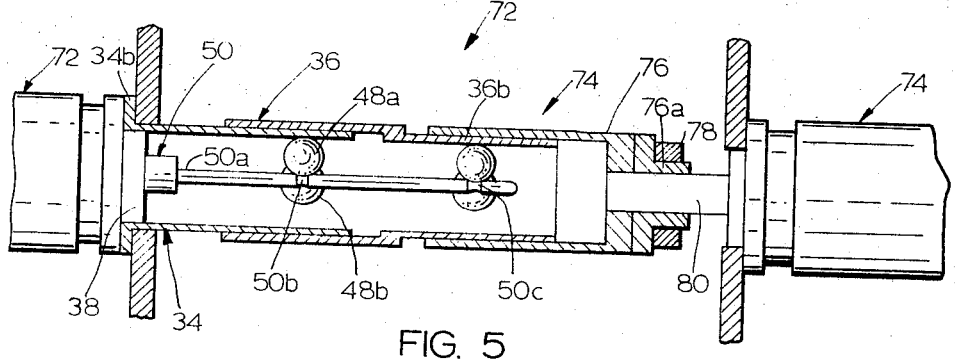

In some cases, it is desirable to obtain an even higher reduction ratio than is feasible in a single stage. In such an event, the invention contemplates a multi-stage device as exemplified by the two-stage transmission 72 shown in FIG. 5, coupling between a motor 74 and a driven device 76. The first stage may be in all respects identical to that shown in FIG. 3 and, therefore, the common parts are designated by the same reference numerals. It differs only in that outer nested member 36 carries a coaxial tubular extension 36b which forms one of the nested members of a second stage 74 of transmission 72. An additional tubular member 76 receives extension 36b in nested relation and completes the second stage of the transmission.

The outer tubular member 76 of the second stage is formed with a split collet 76a on its end wall which receives the input shaft of driven member 74 and is locked thereon by means of a locking collet 78.

The drive member, i.e., the output shaft 50a of drive motor 72, extends entirely through the first stage and into the nested portions of the extension 36b and additional cup member 76 forming second stage 74. A groove 50c forming a raceway is provided to accommodate the spherical planetary members 82a, 82b, etc., which operate the second stage in the same manner as already described. While fundamental operating principle of both stages is the same, it should be noted that outer tubular member 36 of the first stage rotates in a direction opposite to that of the outer member 76 of the second stage. Consequently, the output rate is the difference between the rates of rotation of these two members. Due to this differential action, speed reduction ratios in the order of 20,000:1 can be obtained.

Figure 7:
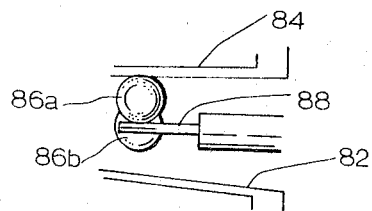
Figure 8:
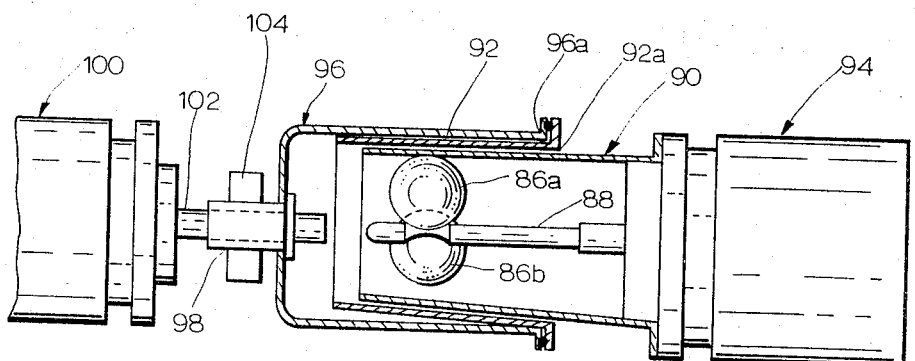
FIG. 8 is an axial sectional view of a torque transmission device embodying the features of the invention illustrated schematically in FIGS. 6 and 7.

The invention further contemplates an embodiment in which both of the nested members are identical and permit a variable assembly to achieve a wide range of reduction ratios, as will now be explained with reference to FIGS. 6 and 7 which illustrate this concept schematically and, subsequently, to FIG. 8 showing an actual practical embodiment of the principle.

In accordance with this particular feature of the invention, both the inner and outer tubular members 82 and 84, respectively, are of frusto-conical configuration and of identical dimensions. Assembly is acomplished by nesting the tubes as shown in FIG. 7, positioning the spherical planetary members within the nested tubes (utilizing a suitable tool or fixture for holding the spheres in position) and then inserting a drive member 88. The spheres and drive member are dimensioned relative to each other and the diameters of the nested tubular members so that insertion of the drive member causes radial outward deformation of the tubular members as hereinbefore explained. In this connection it should be noted that, despite the tapered configuration of the tubular members, the deformation produced by the planetary members causes the deformed region to assume a position which is substantially parallel to the axis of the drive shaft, thus eliminating an axial thrust condition.

Figure 6:
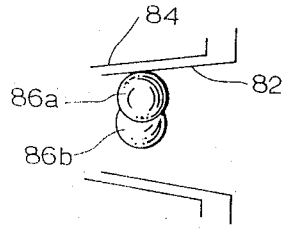
FIGS. 6 and 7 are schematic views utilized to facilitate description of still another embodiment of the invention.

Aside from the ease of assembly provided by the particular configuration illustrated in FIGS. 6 and 7, it will be seen that the difference between the O.D. of inner tubular member 82 and the I.D. of the outer tubular member 84 is a function of the relative axial displacement, that is, the more closely-nested the members, the smaller the clearance and, consequently, the higher the reduction ratio. It will, of course, be appreciated that planetary members and drive shafts of different diameters would be required to accommodate any large differences in a relative axial displacement of the tubular members.

In an actual practical embodiment, shown in FIG. 8, utilizing tapered tubular members 90, 92, the inner member 90 is fixed to the housing of a drive motor 94 in any suitable manner and outer member 92 is secured, as by spot welding of its flange 92a to a radially outwardly extending flange 96a on a cup-shaped member 96, similar to that shown in FIG. 3, having a split collet 98 at its closed end. As described in conjunction with FIG. 3, the driven device 100 has a shaft 102 extending into the split collet and locked therein by a clamp collar 104. The split collet-locking collar coupling between cup-shaped member 96 and the driven shaft 102 permits axial adjustment between inner and outer tubular members in order to change the clearance between the tubular members and thus vary the ratio in the manner already explained.

Figure 9:
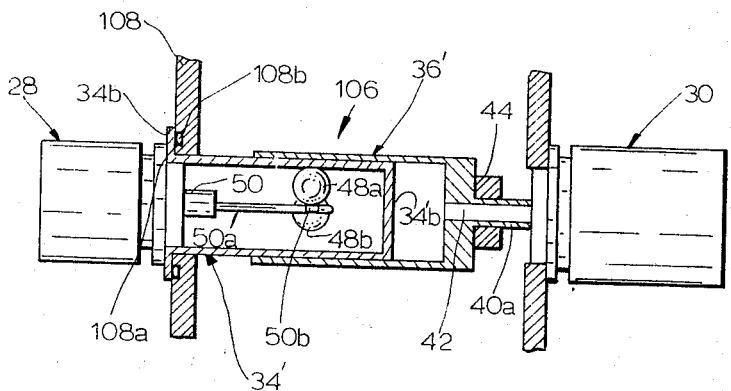
FIG. 9 is an axial sectional view of an additional embodiment of the invention.

In FIG. 9 there is illustrated a hermetically sealed torque transmission device 106 which permits introducing rotary motion to or from a mechanism contained within a closed chamber or compartment the wall of which is fragmentally represented at 108. Sealed rotary motion transmitting mechanisms of a conventional type now in common use are disclosed in United States Letters Patent Nos. 2,419,074 to F. D. Herbert Jr., and 2,454,340 to W. P. Reichel.

As the basic structure of the sealed device 106 is very similar to transmission 32, FIG. 3, corresponding parts are designated by common reference numerals, primed in the case modified parts in FIG. 9, thus obviating the need for repetitious description. Thus, it will be evident that inner tubular member 34' differs from 34 in that it has an end wall 34'd at the end remote from flange 34b and nested within outer member 36'. Both tubular members 34' and 36' are devoid of the apertures 34c and 36c utilized in the FIG. 3 and other embodiments to impart compliance to the nested sidewall portions. To compensate for the omission of apertures, the axial dimensions of the tubular members are increased so as to dispose the active nested portions (i.e., the regions acted upon by planetary members 48a, 48b, etc.) sufficiently remote from the ends of the tubular members that the end walls and associated structure do not significantly diminish the compliance of the side walls.

An annular groove 108a in compartment wall 108 contains an O-ring 108b or like packing to seal between the mating surfaces of the wall and flange 34b. The operation of this form of the transmission device is the same as already described.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:
1. A torque tranmission device, comprising:
   a pair of coaxially-nested members of generally tubular configuration, both of said members having relatively thin side walls formed of resilient material, whereby they are radially distortable to a significant degree, one of said members being adapted to be fixed against rotational displacement, there being a finite difference between the inner diameter of the outer member and the outer diameter of the inner member; and
   means for producing contact between the circumferences of said tubular members and conjoint distortion thereof radially outwardly at a localized region and for angularly displacing said region about said circumferences.

2. A torque transmission device according to claim 1, wherein said means comprises a planetary member, of circular cross-section smaller than the cross-section of said nested members, and means mounting said planetary member for rotation about the axis through the center of its circular cross-section and parallel to the common axis of said nested members, and for planetating movement about said common axis of said nested members with the circumference of said circular cross-section of the planetary member in rolling contact with, and exerting a radially outward force on, the inner surface of the inner one of said nested members.

3. A torque transmission device according to claim 1, wherein the materials of said tubular members have different thermal expansion coefficients selected to vary said finite difference in diameter to compensate for variations in input to output speed ratios due to ambient temperature changes.

4. A torque transmission device according to claim 1, wherein the parameters affecting the force of frictional engagement between the contacting regions of said members are selected to impose a maximum limit on the torque transmitted by said device.

5. A torque transmission device according to claim 4, wherein said parameters include the coefficient of friction and surface finishes of the outer circumferential surface of the inner member and inner circumferential surface of the outer member.

6. A torque transmission device, comprising:
   a pair of coaxially-nested members of generally tubular configuration, both of said members having relatively thin side walls formed of resilient material, whereby they are radially distortable to a significant degree, one of said members being adapted to be fixed against rotational displacement, there being a finite difference between the outer diameter of the inner member and the inner diameter of the outer member;
   a plurality of substantially identical planetary members disposed within said nested tubular members, each of said planetary members being of substantially circular cross-section in a plane perpendicular to the axes of the tubular members, the planetary members being deployed with the geometric centers of their cross-sections defining the respective apices of an equilateral, equi-angular polygon; and
   a drive member, having a circular cross-section in said perpendicular plane, disposed amid said planetary members with the geometric center of its cross-section substantially coincident with the geometric center of said polygon, the respective peripheries of the circular cross-section of said drive member and planetary members being in tangency, the diameters of said cross-sections being such with respect to each other and to the cross-sectional dimensions of said tubular members that the diameter of a circle jointly circumscribing and tangent to said planetary members is larger than the internal diameter of the inner one of said nested tubular member, whereby both of said tubular members are distorted radially outwardly at the points of tangency with said planetary members.

7. A torque transmission device, according to claim 6, wherein said polygon is an equilateral triangle.

8. A torque transmission device, according to claim 6, wherein said planetary members are of cylindrical configuration.

9. A torque transmission device, according to claim 6, wherein said planetary members are of spherical configuration and at least one of said drive members and said inner nested members includes groove-defining means forming a raceway for the spherical planetary members.

10. A torque transmission device, according to claim 6, wherein said nested members have tapered tubular portions of substantially identical radial dimensions and configuration and are maintained against relative axial displacement at a pre-selected relative axial position corresponding to a desired difference between said inner and outer diameters.

11. A multi-stage torque transmission device, comprising:
    a pair of coaxially-nested members of generally tubular configuration, both of said members having relatively thin side walls formed of resilient material, whereby they are radially distortable to a significant degree, one of said members having a coaxial tubular extension, the other member being adapted to be fixed against rotational displacement;
    an additional tubular member disposed in coaxially-nested relation with said extension; and
    means for producing contact between the circumferences of said pair of tubular members and conjoint distortion thereof radially outwardly at a localized region, for producing contact between the circumferences of said additional member and coaxial tubular extension and conjoint distortion thereof radially outwardly at a second localized region, and for angularly displacing said regions about said circumferences.

12. A torque transmission device, comprising:
    a pair of coaxially-nested members of generally tubular configuration, both of said members having relatively thin side walls formed of resilient material, whereby they are radially distortable to a significant degree, one of said members having a coaxial tubular extension, the other member being adapted to be fixed against rotational displacement;
    a plurality of substantially identical planetary members disposed within the nested portions of said members, each of said planetary members being of substantially circular cross-section in a plane perpendicular to the axes of the tubular members, the planetary members being deployed with the geometric centers of the cross-sections defining the respective apices of an equilateral, equi-angular polygon;
    an additional tubular member disposed in coaxially-nested relation with the extension of said one member;
    a plurality of substantially identical additional planetary members disposed within the nested portions of said extension and additional tubular member, each of said additional planetary members being of substantially circular cross-section in a plane perpendicular to the axes of said tubular members, the additional planetary members being deployed with the geometric centers of their cross-sections defining the respective apices of an equilateral, equi-angular polygon; and
    drive means, having circular cross-sections in said perpendicular plane and planes parallel thereto, disposed amid said planetary members and additional planetary members with the geometric center of said cross-sections substantially coincident with the geometric center of said polygons, the respective peripheries of the circular cross-sections of said drive means, said planetary members and said additional planetary members being in tangency, the diameters of said cross-sections being such with respect to each other and the cross-sectional dimensions of the tubular members that the inner diameter of a circle jointly circumscribing and tangent to said planetary members is larger than the internal diameter of the inner one of said nested tubular members and the diameter of a circle circumscribing and tangent to said additional planetary members is larger than the internal diameter of the inner one of said nested additional tubular member and said extension, whereby the nested portions of said tubular members and of said extension and additional tubular member are distorted radially outwardly at the points of tangency with said planetary members and additional planetary members.

13. A torque transmission device, comprising:
a pair of coaxially-nested members of substantially identical, generally frusto-conical configuration and having relatively thin side walls formed of resilient material whereby they are radially distortable, one of said nested members being adapted to being fixed against rotational displacement; and
means for producing contact between the circumferences of said nested members and conjoint distortion thereof radially outwardly at a localized region and for angularly displacing said region about said circumferences.

14. A torque transmission device, according to claim 13, wherein said means includes a planetary member of spherical configuration having a cross-section smaller than said nested members, and means mounting said member for rotation about an axis through its center and parallel to the common axis of the nested members, and for planetating movement about said common axis with the circumference of the spherical member in rolling contact with an exerting a radially outward force on the inner surface of the inner one of said nested members.

15. A torque transmission device, according to claim 13, wherein said means comprises a plurality of planetary members of spherical configuration, said planetary members being of substantially identical diameter smaller than the internal radius of the nested members in a plane through the centers of said planetary members, said planetary members being symmetrically deployed with their geometric centers defining the respective apices of an equilateral polygon; and
a drive member of circular cross-section, coaxial with said nested members, forcibly inserted amid said planetary members with the geometric center of its cross-section substantially coincident with the geometric center of said polygon, the respective diametrical dimensions of said planetary members and nested members being such with respect to each other and to the drive member that the insertion of the drive member produces radially outward displacement of said planetary members with concomitant radially outward distortion of said nested tubular members.

16. A torque transmission device, comprising:
a pair of cup-shaped members having relatively thin cylindrical side walls formed of resilient material, whereby they are radially distortable to a significant degree, said members being disposed with respective portions of their side walls adjacent their open ends in coaxially-nested relation, one of said members being adapted to be fixed against rotational displacement;
a plurality of substantially identical planetary members disposed within the nested portions of said cup-shaped members, each of said planetary members being of substantially circular cross-section in a plane perpendicular to the axes of the cup-shaped members, the planetary members being deployed with the geometric centers of their cross-sections defining the respective apices of an equilateral polygon; and
a drive shaft of circular cross-section journaled in the closed ends of said cup-shaped members and extending amid said planetary members with its axis substantially coincident with the geometric center of said polygon, the respective peripheries of said drive shaft and planetary members being in tangency, the cross-sectional diameters of said drive shaft and planetary members being such with respect to each other and to the cross-sectional dimensions of said nested side wall portions that the diameter of a circle circumscribing and tangent to said planetary members is larger than the internal diameter of the inner one of said nested side wall portions, whereby both of said side wall portions are distorted radially outwardly at the point of tangency with said planetary members.

17. A torque transmission device, comprising:
a fixed member having thin cylindrical flexible side walls having a radial flange at one end;
a cup-shaped member having thin cylindrical flexible side walls with an inner diameter larger than the outer diameter of said fixed member, a portion of said fixed member remote from said flange being nested in the open end of said said cup-shaped member;
a drive shaft extending coaxially into said one end of the fixed member and through said nested portion;
an arcuate groove in said drive shaft defining an annular raceway thereon within said nested portion; and
at least three spherical planetary members disposed in said raceway, said spherical members having a diameter greater than the radial distance between the bottom of said groove and the inner surface of said fixed member, whereby the nested portions of the side wall of both said fixed and said cup-shaped member are distorted radially outwardly at localized regions.

18. A torque transmission device comprising:
a fixed member having a thin flexible tubular portion with a flange portion at one end;
a movable member having a thin flexible tubular portion coaxially receiving in nested relation the tubular portion of said fixed member, said movable member having an enlarged ring-gear portion at its end adjacent the flange portion of said fixed member;
bearing means journalling said ring-gear portion on the tubular portion of said fixed member;
a drive shaft extending coaxially into said one end of the fixed member through said nested tubular portions;
an arcuate circumferential groove in said shaft defining a raceway thereon remote from said one end of the fixed member; and
at least three spherical planetary members disposed in said raceway, said spherical members having a diameter greater than the radial distance between the bottom of said groove and the inner surface of the tubular portion of said fixed member, whereby both of said tubular portions are distorted radially outwardly at localized regions.

19. A torque transmission device according to claim 18, including:
a cap and retainer member closing the other ends of said tubular portions and having a hollow cylindrical portion coaxially projecting into the tubular portion of the fixed member and receiving the grooved end of said drive shaft; and
means defining radial apertures in said hollow cylindrical portions freely rotatably receiving and retaining said planetary members.

(References on following page)

References Cited by the Examiner

UNITED STATES PATENTS

| | | |
|---|---|---|
| 2,943,495 | 7/1960 | Musser. |
| 2,983,162 | 5/1961 | Musser _____ 74—640 |
| 3,117,763 | 1/1964 | Musser _____ 74—640 X |
| 3,119,283 | 1/1964 | Bentov _____ 74—796 X |
| 3,139,770 | 7/1964 | Musser _____ 74—798 |
| 3,148,560 | 9/1964 | Woodward _____ 74—640 X |
| 3,182,525 | 5/1965 | Tinder et al. _____ 74—640 |
| 3,187,862 | 6/1965 | Musser _____ 74—640 X |
| 3,199,370 | 8/1965 | Prior _____ 74—640 |
| 3,209,182 | 9/1965 | Spring _____ 74—640 |

FOREIGN PATENTS 1,275,981  10/1961  France.

DAVID J. WILLIAMOWSKY, *Primary Examiner.*

J. R. BENEFIEL, *Assistant Examiner.*